Figure 1:
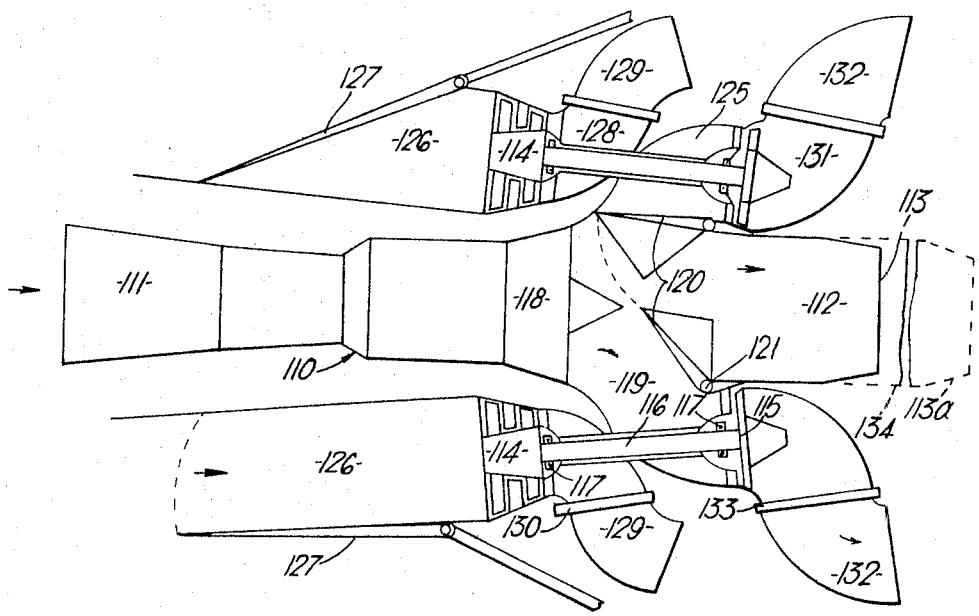

May 9, 1967  L. S. SNELL  3,318,095
JET PROPULSION PLANT FOR AIRCRAFT WITH GAS TURBINE
ENGINE AND WITH FAN DRIVEN BY
EXHAUST OF SUCH ENGINE
Filed May 7, 1965  2 Sheets-Sheet 1

Inventor
LEONARD STANLEY SNELL
By
Bailey Stephens + Huetty
Attorneys

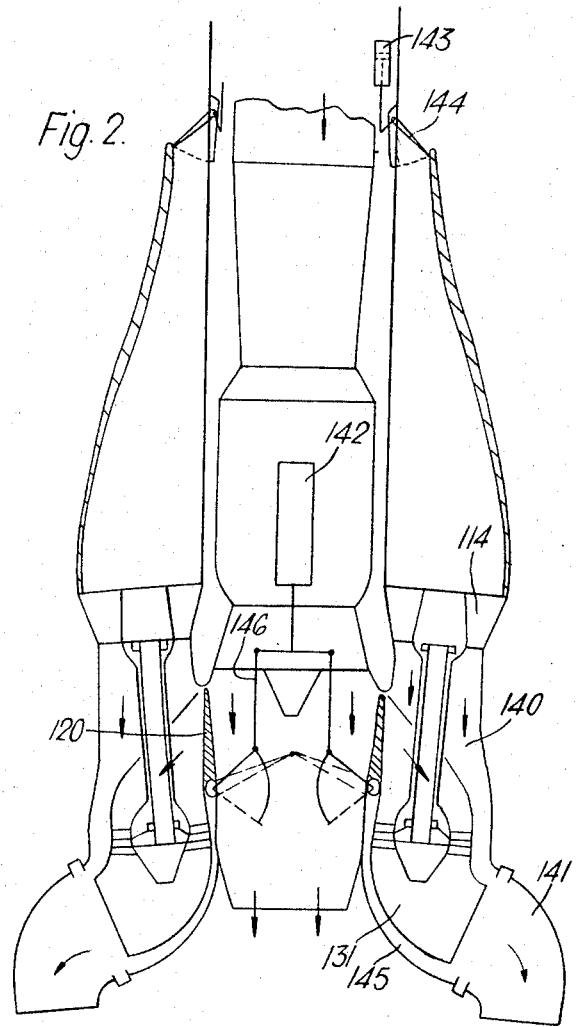

United States Patent Office 3,318,095
Patented May 9, 1967

3,318,095
JET PROPULSION PLANT FOR AIRCRAFT WITH GAS TURBINE ENGINE AND WITH FAN DRIVEN BY EXHAUST OF SUCH ENGINE
Leonard Stanley Snell, Bristol, England, assignor to Bristol Siddeley Engines Limited, Bristol, England, a British company
Filed May 7, 1965, Ser. No. 453,972
Claims priority, application Great Britain, May 14, 1964, 20,165/64
3 Claims. (Cl. 60—226)

This invention relates to aircraft gas turbine jet propulsion power plants in which a thrust is obtained by rearward discharge of exhaust gas and compressed air.

This invention is a development of another invention which is the subject of the United States of America application No. 450,012, filed Apr. 22, 1965, by R. M. Denning and W. J. Lewis and assigned to Bristol Siddeley Engines Limited. According to that other invention, a jet propulsion power plant comprises a gas turbine engine, a further turbine rotatable by the exhaust from the engine, a fan, and a shaft connecting the fan to the further turbine, wherein the gas turbine engine is radially offset from the axis of the fan.

According to the present invention a jet propulsion power plant also includes means for selectively rendering the further turbine or turbines operative or inoperative.

This is of particular value in power plants for VTOL (vertical take off and landing) aircraft, where the demands on the power plant under high speed conditions and under take-off or landing conditions are widely different.

The invention will be explained in more detail with reference to examples, which are shown in the accompanying drawings. In these drawings:

FIGURE 1 is a diagrammatic horizontal section of a power plant, showing the two halves in different states of adjustment; and FIGURE 2 is a diagrammatic horizontal section of a second power plant.

The propulsion plant shown in FIGURE 1 comprises a gas turbine engine 110 having a front air intake 111 and a straight jet pipe 112 terminating in a main rear nozzle 113 for forward propulsion, and a pair of fan and turbine units each comprising an axial flow fan 114 arranged to be driven by an axial flow turbine 115 through a shaft 116 mounted on bearings 117. The units are offset from the engine 110 and are mounted symmetrically to port and starboard of the engine turbine casing 118 and jet pipe 112.

The engine normally discharges its turbine exhaust gas through the main propulsion nozzle 113. The upstream portion of the jet pipe is substantially square in cross section and is provided with side ports 119 controlled by a pair of diverter valves 120 which are pivotable at their downstream ends about chordwise axes 121 between an inoperative outer position (shown in full lines in the right half of FIGURE 1) in which they mask the ports 119 and an operative inner position (shown in full lines in the left half of FIGURE 1) in which their upstream ends meet one another to obstruct the gas flow through the jet pipe 112 and divert it laterally outwards through the unmasked ports 119. The latter communicate with curved gas ducting 125 leading to the unit turbines 115. If desired the jet pipe 112 may be extended rearwards as shown in chain lines at 134 to accommodate a reheat combustion system (not shown) between the diverter valves 120 and the main nozzle 113a.

The fan and turbine units have air intakes 126 which are separate from the engine intake 111 and provided with shutters 127. As shown in the right half of the drawing, the shutter concerned extends across the intake 126 thus cutting off the supply of air to the fan 114 and so rendering it inoperative. In the other half of the drawing the other shutter is shown in its open position in which it allows an air flow to reach the other fan. The delivery casing 128 of each fan curves away from the engine and communicates with an auxiliary propulsion nozzle 129 of elbow-shape which is rotatable about an axis transverse to the unit shaft 116 so as to vary the direction of its discharge between substantially rearwards for forward propulsion, downwards for vertical take-off or landing, and forwards of downwards for jet braking (assuming the engine to be forward-facing and horizontal). The nozzle bearing is marked by the reference 130.

Each unit turbine 115 discharges into a pipe 131 which also curves away from the engine and communicates with an auxiliary propulsion nozzle 132 of elbow-shape which is rotatable in a manner similar to that of the air nozzles 129. The nozzle bearing is marked by the reference 133.

The propulsion plant(s) is or are installed in an aircraft so that preferably the resultant upthrust when all the nozzles 129, 132 are rotated downwards passes through or near the centre of gravity of the aircraft, thus promoting stability during vertical take-off and landing.

An aircraft with a propulsion plant as shown in FIGURE 1 may be operated as follows. For vertical take-off, the auxiliary nozzles 129, 132 are rotated downwards, the shutters 127 are opened, and the diverter valves 120 are moved to their diverting positions to bring the compressor-turbine units into operation. The downward discharge from the cluster of four nozzles 129, 132 causes the aircraft to rise, and thereafter the transition to forward flight is carried out by rotating the auixilary nozzles 129, 132 until they all discharge rearwards. For subsonic flight the fan and turbine units may continue to be used, thus promoting fuel economy. For high speed or for supersonic flight, the diverter valves 120 are moved to mask the ports 119, thus cutting off the supply of gas to the unit turbines 115, and to permit the exhaust gas to be discharged through the main nozzle 113, whilst the shutters 127 are extended to close the air intakes 126 leading to the unit compressors. The propulsion plant now functions as a plain turbojet with both the fan and turbine units inoperative.

In a modified version of the propulsion plant, the delivery casing 128 of each fan may be lengthened and provided with means for burning fuel upstream of the auxiliary nozzle 129 for increasing the maximum thrust of the plant.

In appropriate installations the air intakes 126 may be arranged to tap off boundary layer air which has been flowing over the aircraft fuselage or wings.

FIGURE 2 shows a modification of the power plant shown in FIGURE 1. In FIGURE 2 the delivery casing 140 of each fan 114 is extended rearwards as a duct 145 which surrounds the discharge pipe 131 of the turbine 115. Thus the fan and the turbine discharge concentrically into a common elbow-shaped nozzle 141.

FIGURE 2 also shows an actuating ram 142 for the diverter valves 120, with linkage 146; and an actuating ram 143 for valves 144, which perform the same function as the shutters 127 in FIGURE 1.

I claim:
1. A jet propulsion power plant comprising a gas turbine engine, a fan supported for rotation about a fixed axis substantially parallel to that of the engine, a second turbine, a shaft drivingly connecting the second turbine to the fan, a main duct for the exhaust from the engine, a second duct containing the second turbine, means for diverting the gases from the main duct into the second duct to drive the second turbine, a third duct containing the fan and having an inlet thereinto and an outlet therefrom, means for closing the inlet, and means for varying the direction of discharge from the outlet.

2. A power plant according to claim 1, the second duct having an outlet therefrom and means for varying the direction of discharge from the outlet of said second duct.

3. A power plant according to claim 1, wherein the second duct has an outlet situated within the outlet of the third duct.

References Cited by the Examiner

UNITED STATES PATENTS

| | | | |
|---|---|---|---|
| 2,564,370 | 8/1951 | Myers | 60—35.6 |
| 2,896,408 | 7/1959 | O'Donnell | 60—35.6 |
| 3,033,492 | 5/1962 | Rowe | 244—23 |
| 3,068,647 | 12/1962 | Santamaria et al. | |
| 3,154,917 | 11/1964 | Williamson | 60—39.16 |
| 3,176,934 | 4/1965 | Kappus | 244—12 |

CARLTON R. CROYLE, *Primary Examiner.*